United States Patent [19]

Imai et al.

[11] 4,439,255

[45] Mar. 27, 1984

[54] PROCESS FOR PRODUCTION OF HEAT RESISTANT INSULATED ELECTRIC WIRE AND CABLE

[75] Inventors: Takeshi Imai, Oobu; Naohiro Kako, Takahama, both of Japan

[73] Assignee: Nippondenso Co., Ltd., Kariya, Japan

[21] Appl. No.: 356,502

[22] Filed: Mar. 9, 1982

Related U.S. Application Data

[62] Division of Ser. No. 131,767, Mar. 19, 1980, abandoned.

[30] Foreign Application Priority Data

Mar. 23, 1979 [JP] Japan ................................. 54-34790
Mar. 23, 1979 [JP] Japan ................................. 54-34791
Dec. 10, 1979 [JP] Japan ................................. 54-160674

[51] Int. Cl.³ ........................ B21F 15/02; H01B 13/00
[52] U.S. Cl. ........................................ 156/49; 29/860; 29/868; 156/50; 156/89; 156/155; 156/158; 174/84 R; 174/102 P; 174/110 N; 174/118; 174/120 SR; 228/44.1 A; 228/173 E; 228/904; 427/118; 427/120; 428/383; 428/384; 428/389; 428/391

[58] Field of Search ........ 174/110 N, 110 R, 110 SR, 174/118, 119, 120 R, 120 SR, 102 P, 84 R; 427/71, 116, 117, 118, 120; 428/372, 379, 383, 384, 389, 391; 29/860, 868; 156/49, 50, 155, 158, 89; 228/44.1 A, 173 A, 173 E, 904

[56] References Cited

U.S. PATENT DOCUMENTS 3,222,219 12/1965 Saunders et al. .................. 428/384
4,000,362 12/1976 Kawaguchi et al. ......... 174/120 SR

FOREIGN PATENT DOCUMENTS 431560 4/1975 U.S.S.R. ............................... 29/860

*Primary Examiner*—Robert A. Dawson
*Attorney, Agent, or Firm*—Cushman, Darby & Cushman

[57] ABSTRACT

A heat-resistant insulated electric wire and cable which comprises an electric conduction; the first coating layer thereon consists of a mixture of a binder and a finely ground and unmelted inorganic substance; and the second organic insulating coating layer formed on the first coating layer. Said heat-resistant insulated electric wire can advantageously be used for a coil of a magnet or a motor.

11 Claims, 5 Drawing Figures

PROCESS FOR PRODUCTION OF HEAT RESISTANT INSULATED ELECTRIC WIRE AND CABLE

CROSS-REFERENCE TO RELATED APPLICATIONS

This application is a division of our earlier application Ser. No. 131,767 filed Mar. 19, 1980, now abandoned.

BACKGROUND OF THE INVENTION

The invention relates to a heat-resistant insulated electric wire and a cable composed of a plurality of such wires. More specifically, the invention relates to a heat resistant insulated electric wire which comprises an electric conductor and a coating layer thereon of a mixture of a binder and a finely ground and unmelted inorganic substance. This mixture is adhered onto the said electric conductor by heating it at a temperature below its melting point; then an organic insulating layer is formed on the said layer of the mixture. The heat-resistant insulated electric wire of the invention is an excellent heat-resistant insulated electric wire having superior durability, suitable for use as a structural component in magnet-motors which have a structural component consisting of an electric wire coil which is very tightly wound (under a constrainted condition), for example as in the wiper motor of an automobile. Such purposes require heat-resistance and non-flammability.

Heretofore such a heat-resistant insulated electric wire has been produced by baking on a conductor a heat-resistant resin such as polyimide, polyamidoimide, polybenzimidazol, polyimidazolopine, polyesterimide and the like. In recent years, with increased demand needs for small size and weight lightening together with high power, several kinds of ceramic insulated electric wires have been developed. Importance has been attached to the use of this type of electric wire for space exploration and for the interior of a radial ray emitting environment. Furthermore in the field of conductor materials, heat-resistant copper alloys and dispersed reinforced alloys have been developed. Moreover, an almite wire coated with aluminum oxide as an insulator has also been under production.

However, normal use of those almite electric wires having a heat-resistant resin coating as the insulating material thereon are restricted to temperatures below 220° C. for the reason that those resins are organic materials which are weak against heat. Because almite is an inorganic material the normal use of even almite is restricted to temperatures below 300° to 350° C. Accordingly, in order that a heat-resistant insulated electric wire can be made for use in a temperature range greater than that mentioned above, it is necessary to coat the insulated wire with an inorganic material having high heat-resistance, such as glass or ceramics and the like, as an insulating material. Such electric wires have been described in some publications.

Those inorganic material coated insulated electric wires have been produced by baking a heat-resistant resin mixture with powdered mica, clay, talc, glass, short fiber silica and the like contained therein. Recently insulating materials containing as their main insulating component $SiO_2$—$B_2O_3$—$PbO$-glass or $SiO_2$—$MgO$—$Al_2O_3$-glass have attracted much attention in this field. In spite of the merit of excellent heat-resistance, the use of an inorganic material insulated electric wire presents problems due to its lack of adherence to the conductor and its lack of flexibility for coil-winding. Those shortcomings have heretofore severely limited its marketability. Meanwhile, an inorganic material coated insulating electric wire having an excellent heat-resistance has been developed. This conductor is coated by nickel-plating or by applying a clad thereon. The inorganic material coated wire offers an advantage in the fact that an oxidized film does not form on the wire even at a temperature over 600° C. while showing excellent heat-resistance as compared with a steel wire which increases its resistance caused by oxidization at a very high temperature. Under such circumstances, the inorganic material insulated electric wire has again attracted much attention. Nevertheless, the defects of inorganic materials for insulation mentioned above, i.e. the lack of adherence to the conductor and the lack of flexibility necessary for coil winding, have not been solved yet.

Particularly, when insulated electric wires ae used as parts of motors, the feasibility of forming a secure joint with a commutator is the most serious problem.

The connection of a commutator with one end of an electric wire coil is ordinarily carried out in the following manner. That is, one end part of the electric wire coil is wound and caulked on a plural number of clicks of a commutator by an automatic machine, then an electric current is passed through the coil, thereby pushing an electrode toward the clicks from the surrounding area of the commutator. Consequently, the clicks are heated by the generated Joule's heat. An insulating material coated on the electric wire coil is split or melted by the Joule's heat and the conductor of the electric wire coil is connected with and joined to the clicks by the welding process caused by the Joule's heat and the pressure provided by the electrode. Such a connecting method is called "electric fusing". Under these circumstances, a heat-resistant insulated electric wire having the characteristics which make it suitable for "electric fusing" in addition to the properties mentioned above has been eagerly sought by those in this field.

Accordingly, the object of the present invention is to provide a heat-resistant insulated electric wire having thereon an insulating layer superior in flexibility, having excellent heat-resitance and, in addition, having high durability which enables it to tolerate a high-speed winding process. Further such a wire must be able to retain a stable insulation property even after having been subjected to high-speed winding.

Another object of the invention is to provide a process for providing the above heat-resistant insulated electric wire.

DETAILED DESCRIPTION OF THE INVENTION

Figure 1:
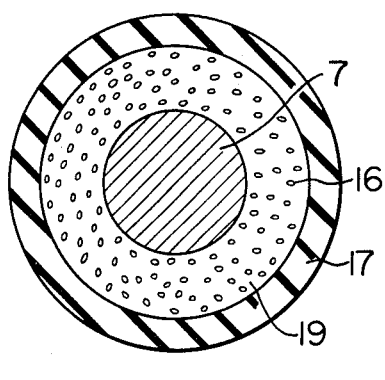
FIG. 1 shows an enlarged sectional view of an embodiment of electric wire of the invention.
Figure 2:
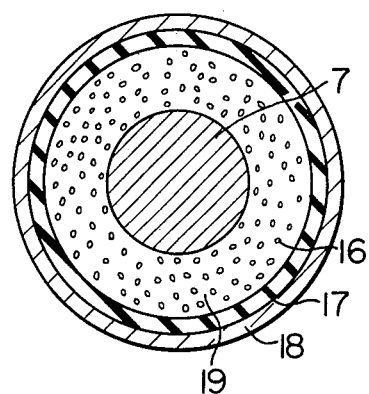
FIG. 2 shows an enlarged sectional view of another embodiment of the invention.

The heat-resistant insulated electric wire of the invention is prepared according to the following procedure. At first, a metal wire which is preferably plated by nickel, zinc or tin and the like is coated with a finely ground inorganic insulating material dispersion to which a binder, such as organic silicone resin, and a suitable solvent has been added. Then the coated wire is heated at a temperature range within which the inorganic material does not sinter into a glass state, i.e. below the melting point of the inorganic insulating material, to drive out and vaporize the solvent used for the dispersion to coat the inorganic insulating material on the wire. The coated wire is then coated with an organic insulating material such as polyimide, which is easily deformable to conform with the shape of the inorganic coating layer, thereby forming a weak bonding with the inorganic insulating material layer, and then it is baked in to obtain the heat-resistant insulated wire.

The electric coil winding prepared with the so produced electric wire can tolerate high-speed winding. Furthermore, the electric wire of the invention makes it possible to carry out automatic winding and automatic electric fusing. In particular, the essential points of the invention lie in the fact that the inorganic insulating layer is first applied to the wire and is then heated so that it does not melt into the glass state and the organic insulating layer is then baked thereon. Furthermore according to the invention the high-speed winding property of the electric wire is improved by further applying a wear-resistant coating, such as a polyamidoimido coating, on the organic insulating layer of the electric wire of the invention.

The advantages of the electric wire of the invention include both the use of the electric fusing connection method mentioned above and the use of coil winding.

The electric wire of the invention has a characteristic structure, especially, in two points. One feature of the electric wire of the invention lies in the fact that the heating of the inorganic insulating layer is controlled so that it takes place below its melting point. Accordingly, this will prevent dispersion of the inorganic insulating layer. Therefore, at the time of electric fusing, the inorganic insulating layer is dispersed out of the wire systems by the melt-flow of the outer organic insulating layer and the pushing added to the wire as mentioned above in reference to "electric fusing". This results in a strong bonding connection of the electric wire with the commutator. If an electric wire having an insulating layer possessing even a higher heat-resistance is desired, a strong insulating layer can be formned by a heat-treatment post winding by means of passing an electric current though the formed coil to produce heat in the coil sufficient to sinter the inorganic insulating layer and to disperse the surface layer of the inorganic insulating material on the plated metal surface of the wire. This results in the advantage of not only of securing an excellent heat-resistance, because of its strong insulating layer which prevents insufficient adherence to the conductor at a temperature higher than a defined temperature, it also especially prevents separation due to oxidation. Also the present electric wire may be used for instruments which require a high level of endurance against vibration which endurance is obtained by baking after winding.

Another feature of the invention lies in the fact that the outer (upper) organic insulating layer is loosely adhered to the inner (lower) inorganic insulating layer. This fact improves the winding property of the electric wire of the invention.

As mentioned above, the electric wire of the invention attains a further superior effect by virtue of both drying the inorganic insulating layer below the melting point thereof, and selecting and organically combining it with the organic coating material which is easily deformable into a shape conforming with the inorganic layer at the time of winding. Furthermore, if a step of coating a releasing agent, such as silicone, wax etc., on the inorganic insulating layer after drying, is added, the deformability of the organic insulating layer applied on the releasing agent layer is further improved, since it would increase the ability of the upper organic layer to expand and contract at the time of winding, thereby to greatly facilitate the winding process.

The invention will now be explained in the following by way of Example only for the purpose of illustration without any intention to add any restrictions on the invention, which is constructed only on the basis of the appended claims.

EXAMPLE 1

At first, the surface of a conductor is pretreated, for example, by nickel plating, and an inorganic insulating layer is then applied thereon, specifically $SiO_2$—$PbO$—$B_2O_3$ glass finely ground into 300 to 450 mesh is the inorganic insulating material. If necessary, $Cr_2O_3$ is added to the finely ground powder. The obtained powder is mixed into a 30% polyimide varnish solution to obtain a dispersion of the inorganic insulating material in the varnish; the ratio of inorganic material to the varnish solution is 1:2. The pretreated wire is coated with the inorganic insulating material/varnish dispersion and heated to a temperature of about 300° to about 500° C. to vaporize out the solvent of the varnish solution; thus an inorganic insulating layer is formed on the conductor.

In the usual heat-treatment of conventional methods, the conductor is heated to a temperature of 800° to 1200° C. to form a vitreous coating on the conductor. Thus the obtained electric wire having a vitreous coating thereon has low flexibility and cannot be used in a high-speed winding process for coil making because of its weak adherence to the conductor.

However, in the invention, the conductor is heated under a controlled temperature range keeping within which the wire is subjected to temperatures of 300° to 500° C., at which the $SiO_2$—$PbO$—$B_2O_3$ glass does not melt, to form the inorganic insulating layer. Then, a heat-resistant paint having an electrically insulating property, such as polyimide resin, is baked on the inorganic layer at a temperature range so as not to melt the inorganic glass layer.

FIG. 1 shows the cross sectional view of the thus prepared electric wire 10. In FIG. 1, 7 shows the conductor, 16 unmelted inorganic material layer and 17 organic insulating layer comprising polyimide.

Furthermore, a wear-resistant film 18 may be formed thereon by baking a paint having good wear-resistance such as polyamidoimido resin in order to improve the electric wire to withstand high-speed winding; 19 shows the binder.

The electric wire of the invention is prepared in such a manner. In other words, the inorganic layer is formed on the conductor by heating it at a temperature at which the SiO$_2$—PbO—B$_2$O$_3$ glass does not melt, for example, below about 500° C. to form a provisional setting of the inorganic layer and then the organic insulating layer 17 is formed thereon.

Because rapid heating may cause bubbling of the inorganic layer which would result in defects in the quality of the final product, it is convenient to increase the temperature gradually or to add an additional step of first vaporizing out the solvent of the dispersion.

In the dispersion of the inorganic insulating material, the paticle size of the inorganic materials has a strong relationship to the winding property of the finished product. In the experiments conducted by the inventors, it was found that preparation of the inorganic particles having a diameter equal to or smaller than 6μ brings about the most stable property. The obtained results are shown in Table 1.

TABLE 1

| | Properties | | | | | |
|---|---|---|---|---|---|---|
| | Winding Round | | Quality | | | |
| Particle size | Property (Own Diameter) | Winding Property* | Film Thickness | Breakdown Voltage | Softening Temp. | Wear Resistant Property |
| not larger than 3μ | o | o | 28–30μ | 7 kV | not less than 550° C. | 40 times |
| not larger than 6μ | o | o | " | 6.5 kV | not less than 550° C. | 40 times |
| 3–10μ | o | Δ | " | 6 kV | not less than 550° C. | 14 times |
| 3–15μ | Δ | x | " | 3.5 kV | not less than 550° C. | 11 times |

*This shows the results of visual observation made on a wound coil for an armature of a wiper motor for automobiles.
o:normal;
Δ:the surface shows a phenomenon of clouding;
x:the surface shows a phenomenon of cracking or pin holes.

The following describes the results obtained at the time of using these insulated electric wires, for example, in a motor for the wipers of an automobile.

Figure 3:
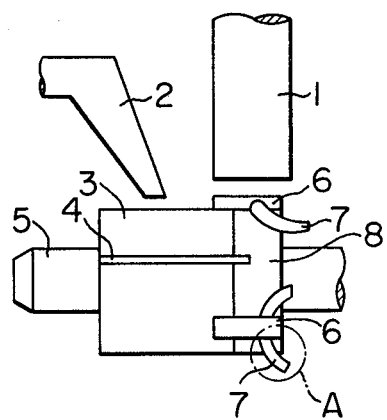
FIG. 3 shows a diagrammatical construction view of the connection process of a commutator with the electric wire shown in FIG. 1.
Figure 4:
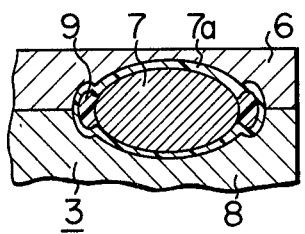
FIG. 4 shows a diagrammatical sectional view of the "electric fusing" process in the conventional connection process of a commutator.
Figure 5:
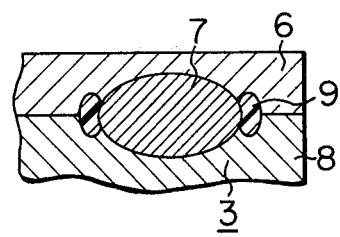
FIG. 5 shows a diagrammatical sectional view of the "electric fusing" process part of the invention.

FIG. 3 shows the connecting part of the coil winding unit with the commutator of a DC motor for the wiper of an automobile. 1,2 show the electrodes for carrying out electric fusing, 3 commutator segments adjacent to the armature of the motor, 4 a trough for the commutator, and 5 a shaft of the motor. The detail at zone A in FIG. 3 shows a connecting click used for electric welding the commutator with the end parts of the wound coil unit having its center on a wire 10 by pushing the electrodes 1 and 2 thereto. 8 shows a low temperature melting conductor layer on which Zn- or Sn-plating is applied in order to facilitate the connection. A shows the electric fusing part of the wire 10 and the connecting click 6; FIGS. 4 and 5 show an enlarged view of this part.

Electric fusing is carried out by passing an electric current through the connection part while pushing the electric wire against the connected parts with the electrodes. At that time, the insulating coating layers are destroyed by the pushing pressure and the Joule's heat generated in that part by passing a current therethrough. The conductor of the electric wire and the connected parts are perfectly welded together to form a good strong connection.

The conventional inorganic material insulating electric wire is not suitable for connection by means of electric fusing. The reason is that, although the conventional inorganic heat-resistant electric wire has superior heat-resistance, the coating cannot be completely removed by the pushing pressure added to the electric wire at the time of fusing and this causes an increase in the electric resistance at that connection point.

In FIG. 4 showing the conventional connection, 7a shows a coating layer on the conductor 7. If the inorganic insulating glass layer were heated to a sintered glass state, this would induce a weakness against a current passing between the commutator and the conductor 7 because the coated substance of the layer of 7a, i.e., the inorganic layer, would remain on the wire, at the time of fusing. FIG. 5 shows an enlarged view of the fusing part obtained when the invention is put into actual operation.

In this point, the invention shows a strong electrical fused connection because the inorganic and inorganic insulating layers are preferably removed by the Joule's heat evolved and the pushing pressure added to the part thereby producing a strong and firm bonding between the metals.

9 shows a carbide formed by burning the polyimide of the upper organic layer.

Furthermore, if it is necessary the following step could be added to the coating of the electric wire of the invention. The additional process involves producing a mechanically stronger insulating property in parts, other than the fusing part.

In other words, a coil unit of a motor having excellent strength and an excellent vibration endurance property can be obtained, when the lower inorganic insulating coating layer is completely sintered and calcinated by passing a current through, for example, an armature coil to reheat the armature and commutator in which the armature coil is made from the heat-resistant insulated electric wire prepared according the above mentioned process.

As explained in the above, the insulated electric wire 10 of the invention is prepared by coating a dispersed inorganic material (16 and 19), which is prepared by adding the binder 19 such as organic silicone etc. to the inorganic powder substance 16, on the conductor 7 having, for example a diameter of 2.5 mm, heating the inorganic substance (16 and 19) to a temperature range under which the inorganic substance does not melt into a glass state, applying the organic insulating layer thereon, preferably in a substantially thinner layer than the inorganic insulating layer. The electric wire 10 of the invention can solve the problem so far unsolved in the art, by modifying the above mentioned structure in such a manner as to improve the excellent high-speed winding capability by adopting as the material for the upper organic coating 17 a material easily deformable into a shape conforming with the lower inorganic insulating coating layer 16 and 19 at the time of winding the insulated electric wire prepared according to the aforementioned Example, around a round metal bar having the same diameter of 2.5 mm as that of the conductor used. Furthermore the invention has solved the problem of automated connection which is encountered in the conventional insulated wire which has often caused problems. In particular, the invention can reliably produce a sound automatic connection of the conductor and commutator in the coil winding unit such as that used in a motor or the like.

The following Table 2, shows an evaluation of the results of the burning properties and fusing properties with reference to a motor prepared with the heat-resistant electric wire obtained by a method similar to the above Example 1.

Example 1—1. The tested electric wire of Example 1-3 was prepared by applying an inorganic insulating dispersion in which an ordinary wax, such as parafin wax, is contained as a binder in place of silicone and baking the dispersion on the conductor at a temperature below the melting point thereof. Next, the electric wire used in Comparative Test 1—1 is an ordinarily commercially available polyimide electric wire and those used in Comparative Tests 1-2 and 1-3 are prepared by applying directly onto the conductor polyimide varnishes which contain respectively 55% of finely ground short fibre glass or $Al_2O_3$ and are then heated at a relatively low temperature. Therefore the samples of Comparative Tests 1-2 and 1-3 have a single insulating layer on each.

EXAMPLE 2

In this Example, the results of Example II and Comparative tests for this Example as Comparative Test II are given, and the obtained results are shown in Table 3 and the explanation given in Table 3.

TABLE 2

| | | | | Item | | | |
|---|---|---|---|---|---|---|---|
| | Burning Resistance | | | | | | |
| | | | Time | | Fusing Properties | | |
| Run | Diameter of wire | Voltage applied | passed before burning (hours) | Numbers of motors measured | Number of Defective | Pass Ratio | Total Evaluation |
| Example 1 | 1  0.7 | 13.5 V | over 250 h. | 50 | 0 | 100% | Good |
| | 2  " | " | over 250 h. | " | 0 | 100% | Good |
| | 3  " | " | over 250 h. | " | 0 | 100% | Good |
| Comparative Test 1 | 1  " | " | 0.5-1 h. | " | 1 | 98% | Bad |
| | 2  " | " | 3-11 h. | " | 29 | 42% | Bad |
| | 3  " | " | 5-8 h. | " | 22 | 56% | Bad |

The results of Example 1 shown in Table 2 are obtained by preparing D.C. motors for wipers of automobiles using copper wires having a diameter of 0.7 mm as a conductor on which is applied a nickel plating and then coated with the above mentioned insulating layer to form heat-resistant insulated electric wire. Example 1—1 in Table 2 uses a 30% organic silicone addition to the inorganic insulating substance dispersion, as a binder. The electric wire tested in Example 1-2 is obtained by coating and baking the coated dispersion on the conductor in which silicon is added to the inorganic dispersion as a binder, and then coating and baking the polyimide varnish thereon at a temperature below the melting point of the inorganic insulating layer, as in

TABLE 3

| | | Item | | | | |
|---|---|---|---|---|---|---|
| | | Winding Property | | Fusing Property | | |
| Run | | Adhesion Property | Winding Property | Run Number | Number of Faulty Wire | Test Passing Ratio | Total Evaluation |
| Example II | 4 | Delamination | | 50 | 0 | 100% | o |
| | 5 | Delamination | o | 50 | 0 | 100% | o |
| | 6 | Delamination | Δ | 50 | 0 | 100% | Δ |
| Comparative Test II | 7 | Close adherence | x | 50 | 0 | 100% | x |
| | 8 | Close adherence | x | 50 | 0 | 100% | x |
| | 9 | Close adherence | x | 50 | 0 | 100% | x |

As used herein: the term "delamination" means separation of the inorganic insulating layer and organic insulating layer, and the term "close adhesion" means a material for producing a close adhesion between the inorganic insulating layer and the organic insulating layer. That is, a material causing delamination reveals a weak adhesion between the upper layer and the lower layer. In fact, even when the lower insulating layer produces cracks as a result of stress caused by winding, the upper insulating layer does not produce cracks thereon. This phenomenon is due to the weak bonding force between the upper layer and the lower layer.

Example II in Table 3 shows data obtained for the winding process of the invention as based on Example I-1. The electric wire used in Example II-4 is one in which the silicon varnish is baked on the inorganic layer and, in addition, polyimide is baked thereon. The electric wire used in Example II-5 is a polyimide baked directly on the conductor. That of Example II-6 is one of polyurethane baked on the inorganic dispersion to which is added either organic silicone or wax. The electric wire of Comparative Test II is the one using an inorganic layer to which no silicone is added so as to cause a close adherence between inorganic layer and the outer organic insulating layer and directly coating the polyurethane and epoxy varnish thereon without coating wax on the inorganic insulating layer. That of Comparative Test II-7 is the one obtained by coating polyurethane and those of II-8 and II-9 are ones coated with epoxy insulating varnish. In the experiments conducted by the inventors, the properties were obtained by re-heating the inorganic insulating substance layer by means of passing a current through it after having formed the winding coil. These properties are required, especially at the time that a winding coil is subject to centrifugal force or vibration. This method can be carried out very conveniently without any fear of causing a faulty connection since this is conducted after the electric fusing has been carried out.

As explained in detail in the above, the invention is based on the technique whereby a dispersion prepared by adding a binder, such as organic silicon and the like, to a finely ground inorganic substance is coated on a conductor, heated to dryness at a temperature below the melting point of the said inorganic substance and then an organic insulating layer is coated thereon and the so-obtained electric wire is wound into a coil. At this time the selection of the material used for the covering organic layer is important. The material must adhere to the underlying inorganic insulating layer though this is difficult. Especially when using a conductor having a small diameter less than 1.5 mm, the assessment of the degree of the strong adherence, namely the degree of the bonding, between the two layers is not easily determined. Therefore the inventors have developed a test method for ascertaining the strength of adherence between the two layers. That is, a test insulated electric wire having a total coating thickness of 30 to 60μ is prepared by coating an inorganic insulating layer on a round conductor bar having a diameter of 2.5 mm and then another testing organic insulating layer, the ratio of the thickness inorganic to the organic layer being 2:1. The test wire is wound two to three times around a cylindrical bar having the same diameter as that of the conductor, i.e. 2.5 mm to form a coil. Then breaks are made on the inner part of the prepared coil of the test wire and the peeling state of the upper layer is examined. The material showing peeling of the upper layer under such conditions is considered suitable for use in the invention.

EXAMPLES 3 TO 7

Although $SiO_2$—$PbO$—$B_2O_3$ glass is used in Example I and II, more particularly in Examples I-1, I-2, I-3, II-4, II-5 and II-6, other glasses or inorganic heat-resistant substances are suitably used for the invention, as illustrated in the following Examples.

In other words, in each of the following Examples the glasses or inorganic materials mentioned below are used as the inorganic layer.

Example 3 $SiO_2$—$B_2O_3$
Example 4 $SiO_2$ only
Example 5 $Al_2O_3$ only
Example 6 $SiO_2$—$MgO$—$Al_2O_3$
Example 7 $Cr_2O_3$ To powers of those glasses or inorganic substances, as the case may be, a binder is mixed and a dispersing solvent added to prepare in each case a dispersion, and the dispersions are respectively coated on a copper wires having a diameter of 0.7 mm in a thickness of 60μ. The coated wire was compared with the cases using $SiO_2$—$PbO$—$B_2O_3$ glass as shown in Examples I and II. The $SiO_2$—$B_2O_3$ glass composition in Example 3 shows a good fusing characteristics similar to the glass used in Examples I and II.

It is seen from each Example that the insulating electric wire of the invention, which finely ground unmelted inorganic substance containing a binder is coated on the conductor and an organic film is coated thereon, provides an insulated wire with a insulating layer thereon having a good flexibility, and a stable coating layer on the conductor and shows an excellent coil winding property by using an organic silicone binder composition as the binder of the finely ground and unmelted inorganic substances coating. Furthermore, similar properties can be obtained by applying a thin coating of a releasing agent, such as silicone oil or wax etc., between the non-melted inorganic substance layer and the organic insulating coating layer.

The heat-resistant insulating electric wires obtained in each Example have superior heat-resistance because the finely ground inorganic powder is temporarily bonded to the conductor with small amounts of binder. Heretofore an insulating electric wire used an inorganic substance as an insulating material has had a deficiency in its flexibility. However the electric wire of the present invention has eliminated the faults of the conventional electric wires by temporarily bonding the finely ground inorganic substances on the conductor with a binder, and forming an organic insulating layer thereon.

The reason for these improvements is that the electric wire of the present invention has an unmelted and non-sintered inorganic finely ground powder layer on the conductor and the adhering force between the inorganic powder layer and the outer covering of organic insulating layer is relatively weak. Polyimide is suitable for use as the organic layer, because it produces a weak adherence onto the inorganic layer.

The structure of the inorganic insulating layer which is constructed with an unmelted inorganic finely ground particulates having a particle size smaller than 6μ, each particle being independent and bonded together with the binder, contributes to produce the smooth fusing for the electric wire of the invention as mentioned above and this makes the automatic electric connection possible.

The quality of the insulating layer of the electric wire of the invention, especially its anti-cracking property and stable flexibility, is induced from the restrictions added to the particle sizes of the inorganic substance by limiting to diameters thereof to not-larger than 6μ.

Furthermore, although in Example 1, heating of the inorganic insulating layer was conducted at a temperature less than 500° C., heating at a temperature above 500° C. may be allowed, if the heating is applied for a sufficiently short period of time.

As explained in detail in the above, the invention produces excellent properties by producing a heat resistant insulating electric wire wherein a strong connection can be easily achieved by fusing, having a good flexibility suitable for coil winding and having a good endurance which enables it to withstand high speed automatic coil winding.

What is claimed is:

1. A method for connecting a heat-resistant insulated electric wire to another electrical conductor which methods comprises the steps of:
   (1) applying an insulating layer on a conductor by coating the conductor with a dispersion of an inorganic substance which dispersion contains a binder therein;
   (2) heating said inorganic dispersion layer to a temperature below the melting point of the inorganic substance; then
   (3) forming an organic insulating layer on said inorganic substance layer to form an insulated electric wire;
   (4) pushing the insulated electric wire against another electric conductor; and
   (5) passing an electric current through said another electric conductor while continuing said pushing thereby heating only the part of the wire being pushed to a high temperature thereby deforming the insulating layer and destroying the insulating layers, consisting of said organic insulating layer and said inorganic substance insulating layer, by the high temperature and the pushing force on only that portion of the wire being pushed, thereby electrically wlding said electric conductor to said another electric conductor to form an electrical connection between them.

2. A method for connecting heat resistant insulated electric wire to another electrical conductor which method comprises the successive steps of:
   (1) applying an insulating layer of an inorganic substance by coating the wire with a dispersin of an inorganic substance which dispersion contains a binder therein;
   (2) heating the inorganic dispersion layer at a temperature below the melting point of the inorganic substance;
   (3) forming an organic insulating layer on said inorganic substance coating layer to form a heat resistant insulated electric wire;
   (4) pushing the heat resistant insulated electric wire against another electric conductor;
   (5) passing an electric current through said another electric conductor while continuing said pushing thereby heating only the part of the wire being pushed to a high temperature, thereby deforming said organic insulating layer and inorganic substance coating layer on the wire by the high temperature and pushing force and destroying the insulating layers on only the portion of the wire being pushed, thereby electrically welding said insulated electric wire to said another electric conductor; and thereafter
   passing an electric current through said insulated electric wire to reheat the inorganic layer and sinter said inorganic substance thereby increasing the strength of the thus treated insulated electric wire.

3. A method of welding a heat-resistant insulated wire onto another electrical conductor and form an electrical connection therebetween, said method comprising the successive steps of:
   (a) contacting and pushing a heat resistant insulated electric wire composed of:
      a metal conductor; a layer of unmelted, non-sintered finely divided paticles of an inorganic insulation material contained in a binder overlying and temporarily bonded by said binder to said metal conductor, said particles not larger than about 6 microns in size; and an overlying sheath of an organic polymer insulating layer coating on and weakly adhered to said layer of inorganic insulation, the thickness of the layer of inorganic insulation being greater than that of the organic polymer sheath, against another electric conductor;
   (b) passing an electric current through said another electric conductor thereby heating only the portion of the wire being pushed to a temperature sufficient to deform the inorganic insulating material layer and thereby destroying the insulating layers on only the portion of the wire being pushed by the combination of said heating and pushing, thereby electrically welding the electric wire to the conductor; and thereafter
   (c) passing an electric current through the wire to sinter the inorganic insulation material without melting the overlying organic polymer sheath and to increase the strength of the thus treated electric wire.

4. A method of welding a heat-resistant insulated wire onto another electrical conductor and form an electrical connection therebetween, said method comprising the successive steps of:
   (a) contacting and pushing a heat resistant insulated electric wire composed of:
      a metal conductor; a layer of unmelted, non-sintered finely divided particles of an inorganic insulation material contained in a binder overlying and temporarily bonded by said binder to said metal conductor, said particles not larger than about 6 microns in size; and an overlying sheath of an organic polymer insulating layer coating on and weakly adhered to said layer of inorganic insulation, the thickness of the layer of inorganic insulation being greater than that of the organic polymer sheath, and an outer wear-resistant layer of a synthetic resin coated on said sheath, against another electric conductor;
   (b) passing an electric current through said another electric conductor thereby heating only the portion of the wire being pushed to a temperature sufficient to deform the inorganic insulation material layer and thereby destroying the insulating layers on only the portion of the wire being pushed by the combination of said pushing and heating thereby electrically welding the electric wire to the conductor; and thereafter
   (c) passing an electric current through the wire to sinter the inorganic insulation material without melting the overlying organic polymer sheath and increase the strength of the thus treated electric wire.

5. The method according to claim 3 or 4 wherein said sheath is a polyimide film.

6. The method according to claim 3 or 4 wherein said unmelted, non-sintered finely divided particles are of an $SiO_2$—$PbO$—$B_2O_3$ glass or an $SiO_2$—$B_2O_3$ glass.

7. The method according to claim 3 or 4 wherein said binder is a silicone resin.

8. The method according to claim 3 or 4 wherein a coating of a release agent is interposed between the layer of insulating inorganic particles and the sheath.

9. The method according to claim 3 or 4 wherein the surface of the metal conductor has a coating of nickel plated directly thereon.

10. The method according to claim 3 or 4 wherein said wear-resistant layer is a polyamideimide.

11. The method according to claim 3 or 4 wherein said overlying sheath is an easily deformable organic polymer insulating layer coated on, loosely adhered to and taking the shape of said layer of inorganic insulation material, the thickness of the layer of inorganic insulation being greater than that of the organic polymer sheath which is adapted to expand and contract during automated high speed and winding.

* * * * *